United States Patent
Kachouch et al.

(10) Patent No.: US 7,416,237 B1
(45) Date of Patent: Aug. 26, 2008

(54) ADJUSTING SYSTEM OF A MOTOR VEHICLE FOR THE ADJUSTMENT OF A CLOSING PART FOR THE CLOSURE OF AN OPENING OF A MOTOR VEHICLE BODY

(75) Inventors: Checrallah Kachouch, Dortmund (DE); Guido Borrmann, Herten (DE)

(73) Assignee: Brose Schliesssysteme GmbH & Co., Wuppertal (DE)

( * ) Notice: Subject to any disclaimer, the term of this patent is extended or adjusted under 35 U.S.C. 154(b) by 0 days.

(21) Appl. No.: 11/474,508

(22) Filed: Jun. 26, 2006

(51) Int. Cl.
*B62D 33/027* (2006.01)
*F16J 15/48* (2006.01)
(52) U.S. Cl. .............. 296/56; 92/78; 277/928
(58) Field of Classification Search ............ 296/56, 296/146.1; 277/301, 305, 306, 309, 311, 277/928; 92/78
See application file for complete search history.

(56) References Cited

U.S. PATENT DOCUMENTS 2,783,744 A * 3/1957 Tennis ..................... 91/23
2,874,983 A * 2/1959 Densmore ............... 277/525
3,851,867 A * 12/1974 Fricko ..................... 267/120
3,885,778 A * 5/1975 Deisenroth ............... 267/71
4,018,417 A * 4/1977 Hanson .................... 251/63.5
4,512,600 A * 4/1985 King ....................... 292/338
4,529,213 A * 7/1985 Goodman ................. 277/636
5,277,284 A * 1/1994 Pradel et al. ............ 188/322.17

FOREIGN PATENT DOCUMENTS

DE 3115782 A1 * 11/1982 ............ 296/56
EP 169014 A2 * 1/1986 ............ 296/56

* cited by examiner

*Primary Examiner*—D. Glenn Dayoan
*Assistant Examiner*—Paul Chenevert
(74) *Attorney, Agent, or Firm*—Jacob Eisenberg

(57) ABSTRACT

An adjusting system of a motor vehicle for the adjustment of a locking piece is disclosed. The locking piece may be arranged to close a motor vehicle opening. The adjusting system includes a first and second casing extending oblong-wise in a length-wise direction. The second casing has a smaller cross section than the first and is arranged within the first casing so as to be adjustable in the length-wise direction. Sealing elements are arranged on the casings to protect them against humidity and soiling.

A pressure compensation opening is also included and is arranged to compensate for pressure between a casing interior space and a casing environment.

9 Claims, 7 Drawing Sheets

ADJUSTING SYSTEM OF A MOTOR VEHICLE FOR THE ADJUSTMENT OF A CLOSING PART FOR THE CLOSURE OF AN OPENING OF A MOTOR VEHICLE BODY

BACKGROUND OF THE INVENTION

The present invention is directed to an adjusting system of a motor vehicle for the adjustment of a closing part of the closure of an opening of the motor vehicle body.

SUMMARY OF THE INVENTION

According to the invention, an adjusting system of a motor vehicle for the adjustment of a closing part is provided between an opening position and a closing position. Accordingly, the closing part operates to close a body opening of a motor vehicle body. Such a closing part may be a rear flap, a trunk deck, an engine room deck, a window pane, a sliding or a swinging door. The closing part is adjustable within a setting range from an opening position to a closing position. The adjusting system thereby comprises several components which are preferably connected in such a way that a compact structure can be achieved.

The adjusting system comprises a first casing extending along its length in an oblong manner. Furthermore, the adjusting system comprises a second casing extending in an oblong manner in the same length-wise direction thereby comprising a smaller cross section and the first casing and further arranged in an adjustable manner, lengthwise, within the first casing. Both casings may be cylindrical so as to promote a simplified production.

Sealing material for the seal of the first and second casing is provided. The material should seal the inner space of the casing against humidity and soiling. Such sealing material may be for example sealing rings, oils or elastomers which make up one or more sealing lips.

A pressure compensation opening for the pressure compensation between the inner space of the casing and a casing environment is provided. The pressure opening may be developed in the first casing, in the second casing or in the sealing material. A pressure difference can occur by the adjustment of the second casing from the first casing because the total volume in the first casing and the second casing increases. Because the first and the second casings are sealed, a negative pressure would occur with this adjustment. The negative pressure may be compensated for by air movements and by the pressure compensation opening.

However, pressure compensation is not necessary in the closed position so that in the closed position the opening for the pressure compensation is arranged within the inner space of the casing and is sealed against the casing environment by the sealing material.

According to an embodiment of the present invention, in the opening position, the closing part of the pressure compensation opening is provided so as to effectuate pressure compensation between the inner space of the casing and the environment of the casing which is further not sealed by the seating material. This means that the pressure compensation opening is closed in the closed position so that pressure compensation is prevented. The pressure compensation opening for pressure compensation is opened, on the other hand, in the opening position. Preferably, the pressure compensation opening is thereby at least not closed in a section of the setting range between the completely opened and the closed position so that pressure compensation can occur over this section of the setting range.

Another embodiment of the present invention provides the pressure compensation opening arranged in a wall of the casing of the first casing or the second casing or in the sealing material and is positioned in such a way with respect to mechanical, electro-mechanical or electrical components within the casing, that the humidity and soiling penetrating through the pressure compensation opening does not impair the functionality of the components.

The pressure compensation opening is preferably arranged in a wall of the casing of the first casing, the second casing or in the sealing material, and is positioned in such a way that, in particular, liquid or condensate infiltrated through the pressure compensation opening exits in the direction of gravity, through the pressure compensation opening, from the first casing and respectively the second casing.

According to a further embodiment of the present invention, a membrane is provided which effects liquid or condensate exiting from at least one of the casings and that no liquid or condensate exits into the inner of the casing, at least in the closed position. The pressure compensation opening may be at least closed by the sealing material in the closed position, into which the membrane is integrated, so that the liquid exiting from the pressure compensation opening can reach the casing environment by the membrane.

Accordingly, the membrane is integrated into the sealing material. The membrane can be attached in the sealing material. The membrane can be developed as a single piece with an element of the sealing material formed as a single piece of, for example, a two-component-synthetic. Regarding the sealing material, the membrane is preferably arranged in such a way that both sides of the membrane comprise the same (air) pressure in the opening position of the closing part, whereby both sides are advantageously exposed to the pressure of the environment of the casing.

In a further embodiment of the present invention, the sealing material comprises control (guide) areas for the radial control of a first casing and/or a second casing. These radial controls advantageously allow a support and sliding of the second casing within the first casing. The sliding characteristics of the control areas can preferably be influenced by a to component-synthetic material.

In a still further embodiment of the present invention, at least a sealing element of the sealing material, comprising a two-component synthetic, is provided, with the sealing element having a greater elasticity in the area of the sealing surfaces at least against an attachment area, a control area or a membrane area.

The geometry of the pressure compensation opening is application specific. An advantageous embodiment of the invention provides that the pressure compensation opening is a slot which may be axially aligned. Accordingly, the slot extends to the intermediate area between the first casing and the second casing and is developed by the structure of the part of the sealing material. By way of further design, the pressure compensation opening is a hole which is preferably radially aligned. The hole or the slit may not comprise any capillary effect to reduce the penetration of liquids.

The first and second casings preferably comprise a same cross section so that the second casing advantageously runs on bearings moveable within the first casing in a lengths-wise direction. Advantageously, the first, as well as the second, casing comprise a circular cross section and are preferably tubular or cylindrical.

Furthermore, the adjusting system preferably comprises a spindle for the relative adjustment of the first casing to the second casing, the spindle being arranged within the first casing and/or within the second casing. During an adjustment of the closing part, the spindle moves relative to at least one of the two casings in a length-wise direction. An electro-motor and a transmission of the adjusting system are attached at the first casing and/or at the second casing and connected with the spindle. A force powered and geared by the transmission may operate on the spindle or a spindle nut which is arranged on the spindle for the connection. Therefore, the actuation from electro-motor and transmission and the adjusting mechanism, which comprises at least the spindle, are integrated with the first casing and the second casing to a structure. Therefore, the electro-motor is neither attached at the body nor at the closing part but arranged together with the adjusting mechanism within the sealed casings opposite the casing environment.

A part of the first casing or the second casing is advantageously allocated to a function of the electro-motor in a double function. A casing wall may also provide a magnetic interference of the electro-motor or a dissipater for control elements. The air movement led through the pressure compensation opening can also be used for the cooling of the electro-motor or the control components.

In still further embodiments of the present invention, a bearing for the attachment of the first casing and/or the second casing to the body and in particular at the closing part is provided, whereby the bearing is a pivot bearing and/or a drag bearing.

BRIEF DESCRIPTION OF THE SEVERAL VIEWS OF THE DRAWINGS

In the following, the invention is further explained by way of example embodiments based upon the drawings, wherein.

DETAILED DESCRIPTION OF THE INVENTION

Figure 1:
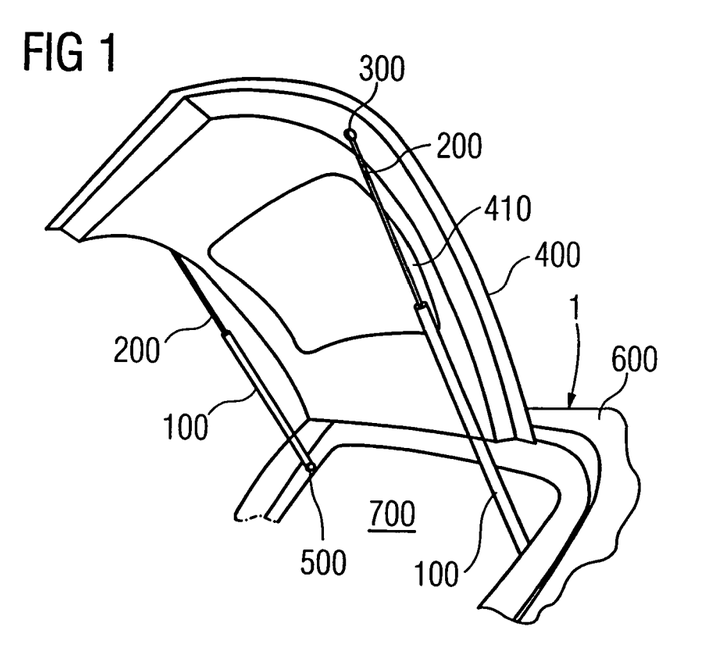
FIG. 1 depicts a view of a rear flap in an opened position.

A three-dimensional detailed view of a motor vehicle 1 with an opened rear flap 400 is shown as a closing part in FIG. 1. The body 600 and the body opening 700 in the body 600 of the motor vehicle 1 which is closable by the rear flap 400 are only shown schematically. Apart from an outer metal sheet, the shown rear flap 400 comprises—if necessary—a lowerable window pane 410 and an adjusting system with a first casing 100, a second casing 200, a first bearing 500 and a second bearing 300. Two such adjusting systems are shown in FIG. 1 which together effects an adjustment of the rear flap 400 between a closed position and an opened position of the rear flap 400.

In other embodiments, not shown in the figures, an adjusting system of a motor vehicle for the adjustment of another closing part such as a rear flap 400 is provided. The adjusting system can particularly be used for the adjustment of a trunk deck, and a sliding or swinging door to close a body opening of the motor vehicle.

Figure 2:
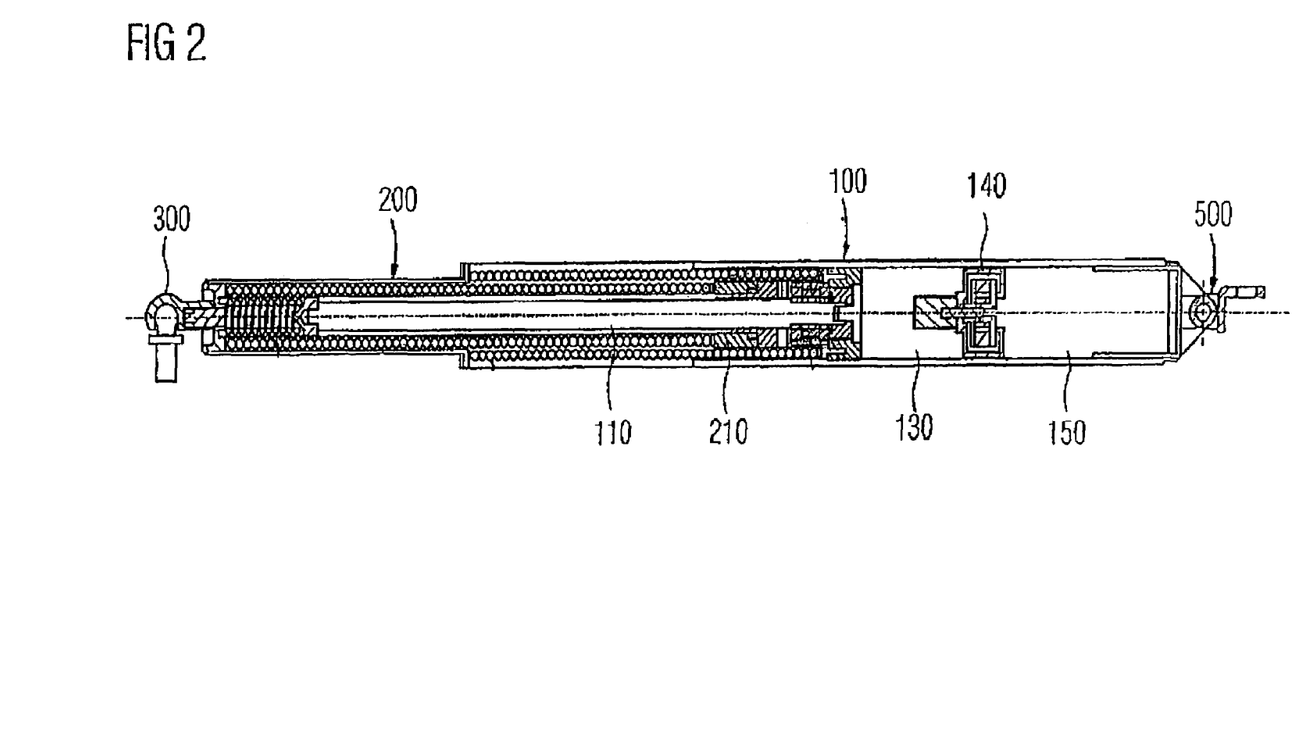
FIG. 2 depicts a cross section through a rear flap adjusting system.

An adjusting system is shown in detail in FIG. 2. The adjusting system comprises a first casing 100 extending oblong in a length-wise direction in the form of an external tube 100. A second casing 200, also in the form of an external tube 200, also extends oblong along the same length-wise direction. The second external tube 200 comprises a smaller cross section than the first external tube 100 and the second external tube 200 is arranged, adjustably, at least partially within the first external tube 100 in the afore-mentioned length-wise direction.

The first external tube 100 is attached on the side of the body while the second external tube 200 is attached on the side of the rear flap. Each bearing 300 and 500 is provided for attachment in the depicted embodiment. The first bearing 500 which is attached at the first external tube 100 preferably comprises two universal (cardan) joints. The second bearing 300, which is attached at the second external tube 200, preferably comprises a ball socket.

An electro-motor 150, a brake 140, a two-stage planetary transmission 130 and an adjusting mechanism with a six-gear trapezoid spindle 110 and a spindle nut 210 rotational bearing upon the trapezoid spindle 110 is arranged at least partially within the first external tube 100. These elements depicted in FIG. 2 influence the dynamic effect chain from the electro-motor 150 onto the adjustment of the rear flap 400. A brake 140 operates between the electro-motor 150 and the planetary transmission 130 which makes it possible that the braking effect can be avoided by either a manual dynamic effect on the rear flap 400 or by the electromotive force of the electro-motor 150. The brake is thereby integrated within the first external tube 100 between the electro-motor 150 and the planetary transmission 130.

If, for example, the electro-motor 150 is controlled by a power field effect transistor, not shown in FIG. 2, but also preferably arranged within the first external tube 100, the moment delivered by the electro-motor 150 minus a low friction of the brake 140 is transmitted onto the two-stage planetary transmission 130. The moment transmitted by the planetary transmission 130 is delivered to the trapezoid spindle 110 which rotates in dependence of the power supply of the electro-motor 150.

The spindle nut 210 is adjusted in an axial direction by the turn of the trapezoid spindle 110. The spindle nut 210 is thereby connected with the second external tube 200 in such a way that the second external tube 200 is adjusted with the spindle nut 210 in the same direction. The spindle nut 210 is thereby preferably fixated at the second external tube 200 or at the part firmly connected with the second external tube 200.

Figure 3A:
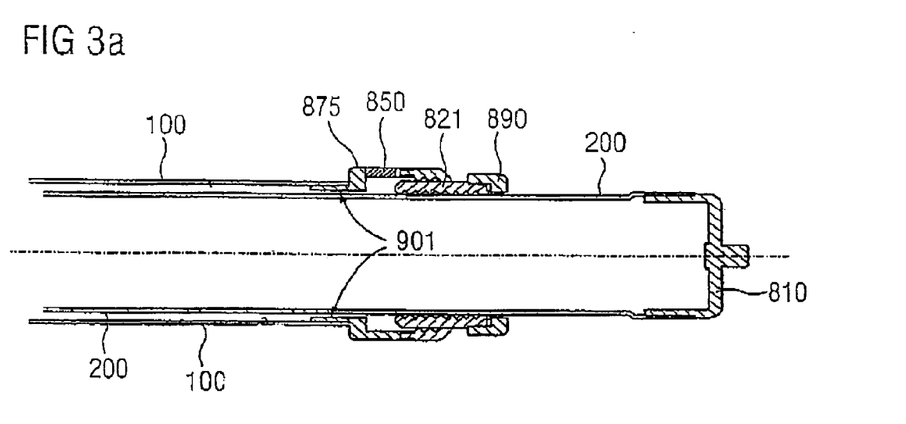
FIG. 3a depicts a first design variation of a sealing and a pressure compensation opening in a cross section.

A first embodiment for a sealing of the actuation of FIG. 2 is shown as a partial cross section in FIG. 3a. Components of the adjusting system not belonging to the sealing function are excluded for better overview in FIG. 3a. The internal casing 200 formed as a tube is closed and sealed by a locking piece 810. The internal casing 200 is partially arranged within the external casing 100 and is moveable and adjustable within it. The adjusting position where the inner casing 200 is adjusted into the external casing 100 the furthest is shown in FIG. 3a. The body opening 700 through the rear flap 400 is also completely closed in this adjusting position. The adjusting system with the casings 100 and 200 is in the exterior of the external casing 100 in every adjusting position so that the dirt particles and humidity do not occur in the area of the adjusting system.

To reduce a soiling of the interior of the external casing 100, additional sealing elements apart from the sealing piece 810 are provided. A seal ring 821, for example from an elastomer, comprises a multiple number of sealing lips 825 which are pressed in a sealable manner against the external wall of the inner casing 200 by a clamping ring 890. Furthermore, a 2K-piece 875 is provided with a scaling and slide control function. The sliding element is thereby arranged in the spacing between the external casing 100 and the internal casing 200. However, no guiding installation is shown in the presented cut in FIG. 3a because a pressure compensation slit 901 is provided in the cutting plane.

This pressure compensation slit 901 creates a pressure compensation canal which enables pressure compensation between the interior of the external casing 100 and the exterior of the external casing 100 of the adjusting system. A pressure difference between the interior of the external casing 100 and the room exterior of the external casing 100 of the adjusting system can thereby occur by a relative adjusting motion of the inner casing 200 to the external casing 100 because both casings 100 and 200 have a common internal volume which can be enlarged or reduced by an adjusting motion.

The 2K-piece hereby depicts sealing areas which operate in a leak-proof manner against the seal ring 821 and against the external casing 100. Additionally, a membrane 850 is integrated into the 2K-piece which enables an emergence of liquids in a closed position and prevents an infiltration of liquids. The emerging liquids could for example have reached the adjusting system by prior condensation. The membrane 850 is adjusted together opposite to the internal casing 200.

In a sequence of a small adjusting motion in the "open" direction, the scaling installation separates the 2K-piece 875 front the sealing ring 821. From the adjusting position, air for pressure compensation flows through the pressure compensation slit 901 into the interior of the external casing 100. In an opposite closing direction, the adjustment effects the reduction of the interior of the external casing 100 so that the air for pressure compensation flows from the interior of the external casing 100 through the pressure compensation slit 901 into the exterior of the external casing 100 until the 2K-piece 875 touches the sealing ring 821. The evolving pressure in the subsequent last motion section can thereby be neglected.

Figure 3B:
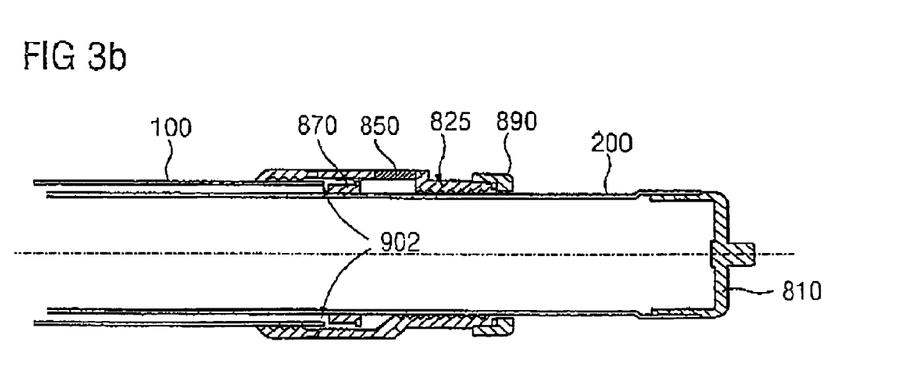
FIG. 3b depicts a second design variation of a sealing and a pressure compensation opening in a cross section, FIGS. 4a and 4b schematically depict a three dimensional view of a guiding means for radial control between an external tube and an internal tube.

Another embodiment of the pressure compensation is shown in FIG. 3b. A pressure compensation hole 902 is provided in the wall of the external casing 100 which in this case functions analogically to the pressure compensation slit 901 of FIG. 3a. A membrane 850 is attached in a stationary manner to the internal casing 200 in this embodiment. Furthermore, a separate guiding element 870 for the slide control is provided such that it is not integrated in the sealing material.

Figure 4A:
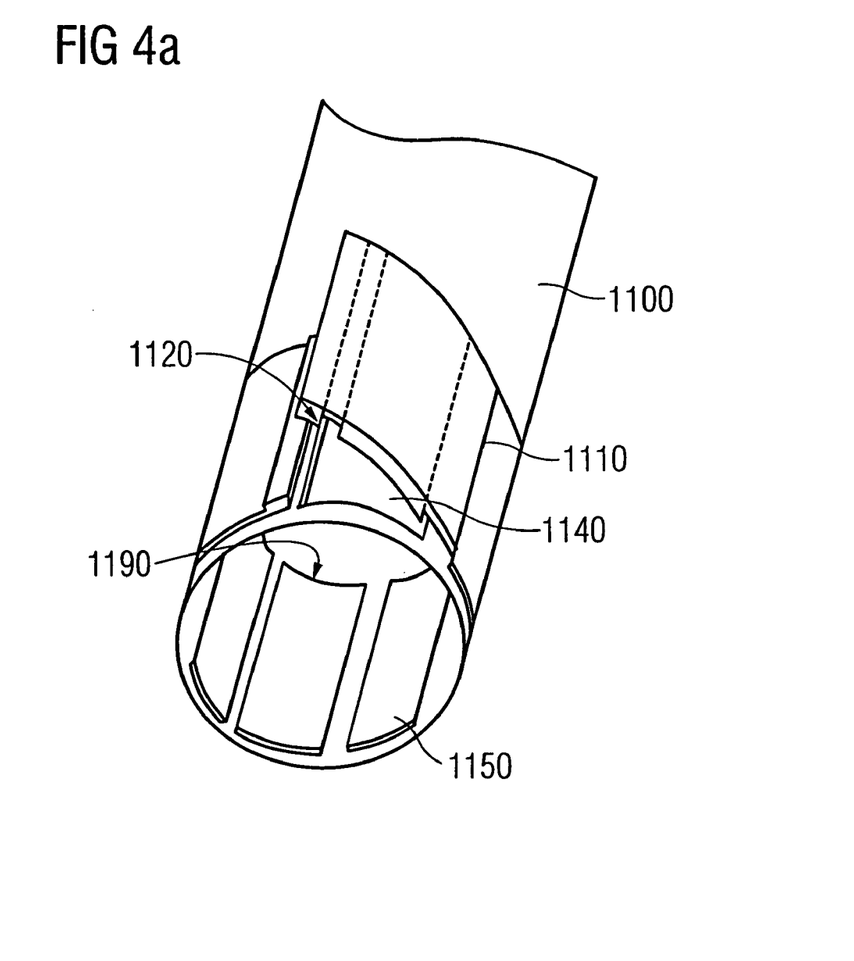
Figure 4B:
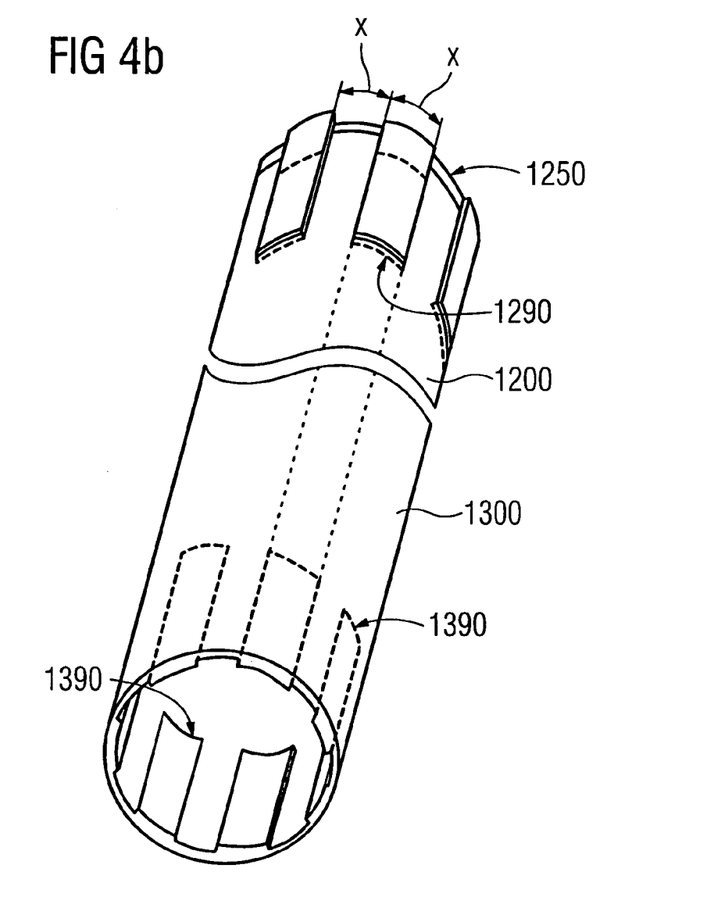

Guiding means for radial control between an external tube 1100 and 1300 and an internal tube 1200 are schematically shown in a three-dimensional view in FIGS. 4a and 4b. A metal tube 1100 is encompassed by a synthetic ring in FIG. 4a which comprises radial inward-protruding sections 1150 for the slide control on an internal tube not shown in FIG. 4a. Furthermore, a film hinge 1110 and a clips connection 1120 for the assembly and affixation of the metal tube 1100 are provided. The radial inwards protruding sections 1150 are lead through openings 1140 in the metal external tube 1100.

Guiding means for radial control between an external tube 1100 and 1300 and an internal tube 1200 are schematically shown in a three-dimensional view in FIGS. 4a and 4b. A metal tube 1100 is encompassed by a synthetic ring in FIG. 4b which comprises radial inward-protruding sections 1150 for the slide control on an internal tube not shown in FIG. 4a. Furthermore, a film hinge 1110 and a clips connection 1120 for the assembly and affixation of the metal tube 1100 are provided. The radial inwards protruding sections 1150 are lead through an opening 1140 in the metal external tube 1100.

Figure 5A:
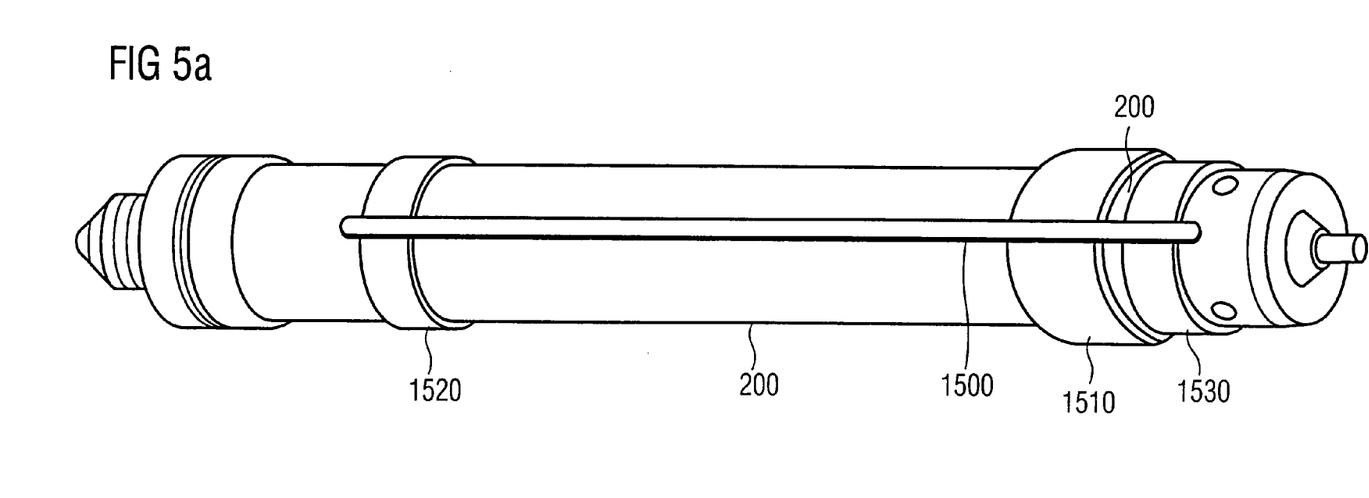
FIGS. 5a and 5d depict an axial locking piston.
Figure 5B:
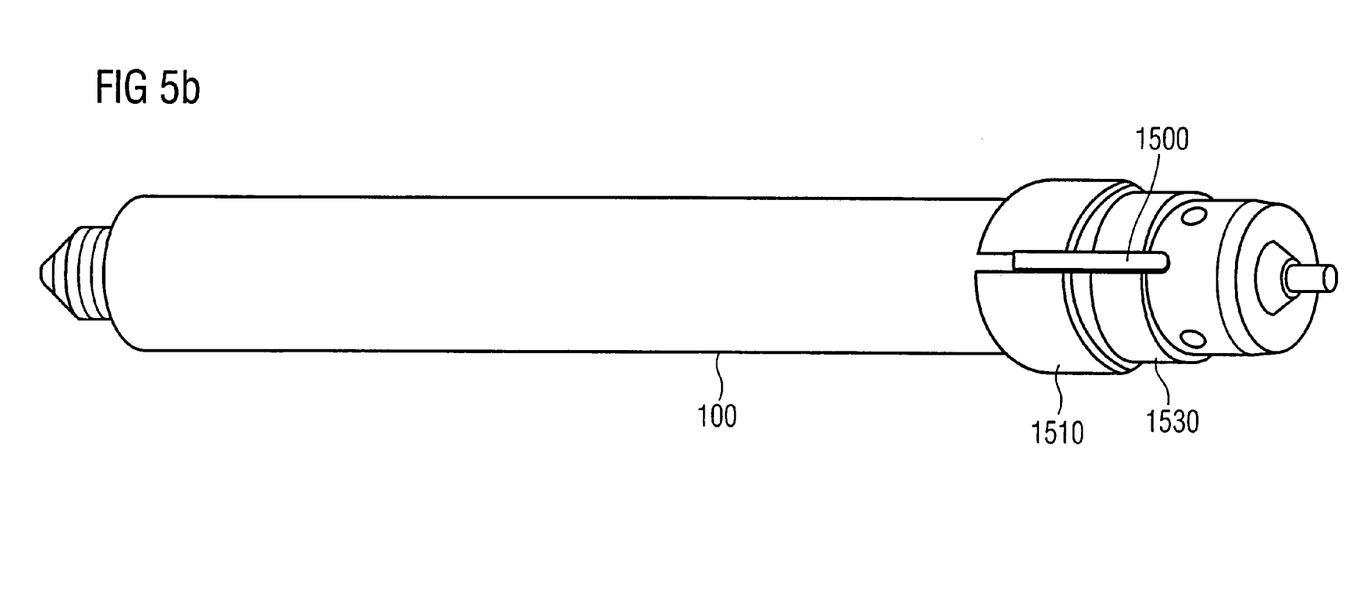

FIGS. 5a and 5b depict an axial locking piston. A fixed link 1500 is hereby affixed onto the internal tube 200. For example, two synthetic rings 1520 and 1530 are hereby arranged in a sliding manner on the internal tube 200. This arrangement comprises an extension within which the fixed ink 1500 glides axially and absorbs the rotatory operating forces between the synthetic ring 1510 and the fixed link 1500 and further supports them. The external tube 100 is rotationally and safely affixed on the further synthetic ring 1510 as shown in FIG. 5b.

The invention claimed is:

1. An adjusting system of a motor vehicle for the adjustment of a locking piece for the closing of a body opening of a motor vehicle body, the system comprising:
    a first casing extending oblong-wise in a length-wise direction;
    a second casing extending oblong-wise along the same length-wise direction comprising a smaller cross section than the first casing and arranged at least partially within the first casing so as to be adjustable in the length-wise direction,
    a sealing means for the sealing of the first casing and the second casing,
    a pressure compensation opening arranged for pressure compensation between a casing interior space and a casing environment, and
    wherein the locking piece is adjustable within a setting range from an opening position to a closing position,
    wherein the pressure compensation opening for the pressure compensation in a closed position is arranged within the casing interior room and is scaled by sealing means against the casing environment,
    wherein said locking piece is one of a rear flap, a trunk deck, a sliding door or a swinging door, and
    wherein a membrane is arranged to effectuate liquid or condensate emerging from at least one casing and that, at least in the closing position, no liquid nor condensate infiltrates into the casing interior room.

2. The adjusting system according to claim 1, wherein the pressure compensation opening is arranged such that in an opened position the opening effectuates a pressure compensation between the casing interior room and the casing environment and is hereto not sealed by sealing means.

3. The adjusting system according to claim 1, wherein the pressure compensation opening is arranged in a section of the first casing, the second casing or the sealing means and positioned approximate to mechanical, electro-mechanical or electrical components within the casing such that infiltrating humidity or soiling through the pressure compensation opening does not impair the functionality of the components.

4. The adjusting system according to claim 1, wherein the pressure compensation opening is arranged in a casing wall of the first casing or the second casing or in the sealing means and positioned such that liquid or condensate infiltrated through the pressure compensation opening emerges in a direction of the gravitation through the pressure compensation position from the first casing and the second casing.

5. The adjusting system according to claim 1, wherein the membrane is integrated into the sealing means.

6. The adjusting system according to claim 1, wherein the scaling means comprises control sections for the radial guidance of at least one of the first and second casing.

7. The adjusting system according to claim 1, wherein the pressure compensation opening is a slit which is preferably aligned axially.

8. The adjusting system according to claim 1, wherein the pressure compensation opening is a radially aligned hole.

9. The adjusting system according to claim 1, wherein said sealing means is arranged to seal said first and second casing against humidity and soiling.

* * * * *